//

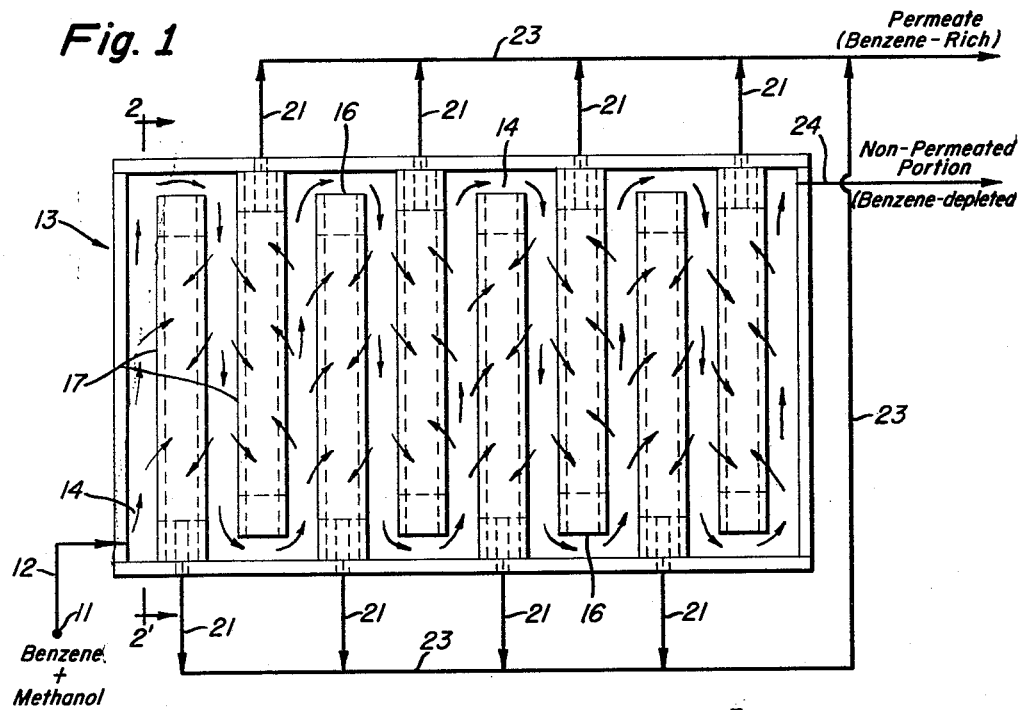
Fig. 1
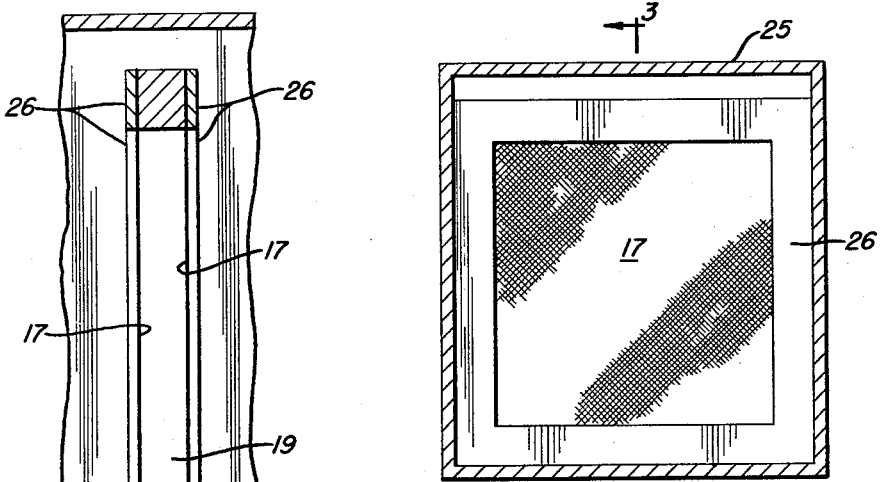
Fig. 3
Fig. 2
INVENTORS:
Joseph F. Jennings
William H. Clingman
BY Joseph C. Kotarski
ATTORNEY

United States Patent Office 3,062,905
Patented Nov. 6, 1962

3,062,905
SEPARATION PROCESS
Joseph F. Jennings and William H. Clingman, Jr., Texas City, Tex., assignors, by mesne assignments, to Standard Oil Company, Chicago, Ill., a corporation of Indiana
Filed May 22, 1958, Ser. No. 737,046
9 Claims. (Cl. 260—674)

The present invention concerns a method for separating organic chemicals and in particular it concerns the use of a permeation process which employs improved permeation membranes.

An object of the present invention is to provide an improved method for separating organic chemicals. Another object is to provide a permeation process for separating organic chemicals, which permeation process uses novel permeation membranes. A further object is to provide a permeation process for separating organic chemicals in which process modified polyolefin films having improved separation characteristics are used as the permeation membranes. These and other objects will be more apparent from the detailed description of the invention.

In accordance with the present invention surface-halogenated polyolefin films are employed as the permeation membrane in the separation of organic chemicals by the permeation process. In this process a permeation apparatus which is comprised of a feed zone that is sealed or separated from a permeate zone by a surface-halogenated polyolefin film is used. The permeation apparatus is maintained under conditions causing permeation to occur when the feed mixture of organic chemicals is introduced into the feed zone. A portion of the mixture of the organic chemicals in the feed zone permeates through the surface-halogenated polyolefin film and passes into the permeate zone. The permeated portion, which has a higher concentration of one of the components of the feed mixture than the concentration of this same component in the feed mixture, is rapidly removed from the permeate zone. The non-permeated portion is withdrawn from the feed zone. The polyolefin film which is used may be one such as polyethylene and/or polypropylene and/or polybutene, or copolymers of such olefins. The polyolefin film, such as polyethylene film, may be subjected to irradiation from high energy electrons produced by a high voltage accelerating apparatus, the electrons being applied at a dosage between about 1 to 200 megareps. Either the irradiated or the non-irradiated polyolefin film may then have one or both of its surfaces halogenated. Surface halogenation may be effected by any suitable technique, for example by contacting the polyolefin film with a halogen material such as chlorine, either as a gas or in water, at a temperature above about 50° F. but below the temperature at which the polyolefin melts. A particularly desirable embodiment consists of surface halogenating only one side of the polyolefin film and then disposing the film in the permeation apparatus in a manner such that the surface halogenated side of the film forms one boundary of the permeate zone and the opposite side of the film (the non-halogenated side) forms a boundary of the feed zone.

As indicated earlier, the permeation membrane used is a plastic polyolefin film. Such plastic polyolefin films may be prepared from the solid polymerization products of ethylene, propylene, butenes such as butene-1, pentenes such as pentene-1, or mixtures of said olefins. The solid polymers and/or copolymers of said olefins which are then formed into film, usually of a thickness of about 0.1 to 10 mils, are subjected to a surface halogenation. Even thinner films than those indicated may be used, and the thinnest possible films which do not readily rupture are preferred since the rate of permeation increases as the thickness of the film is reduced. Any suitable technique for halogenating the surface of the polyolefin film may be used. For example a sheet of the polyolefin film may be passed through a vessel in which is maintained a gaseous halogen atmosphere. Halogen gases such as chlorine, bromine, fluorine, hydrogen chloride, hydrogen fluoride, hydrogen iodide and the like may be directed against the polyolefin film surface with which the halogen reacts to cause surface halogenation. The surface halogenation may be speeded up by increasing the temperature of the film. It is believed that hydrogen tends to be split out from the polyolefin film, thus increasing the olefin content at the surface, and causing faster halogenation to occur. The surface of the polyolefin film may be flash-heated using a hot flame which may reach temperatures as high as 500° F. and higher, but precautions should be taken so that the film surface does not melt and flow, form holes in the film, etc. During the flash-heating, the opposite side of the film may be chilled with cold water, ice or Dry Ice so that the heat applied (which may be flame impingement, heat lamps, etc.) does not extend through the thickness of the film but is instead limited more or less to the surface which is flash-heated. The halogen treatment of the film may be carried out at the same time as it is being heated, or the halogen treatment may be carried out subsequent to the heating of the film surface. Only one surface of the film may be subjected to the halogen treatment, or both surfaces may be surface-halogenated. Somewhat better selectivity, i.e. separation efficiency, is obtained in the permeation process if surface halogenation is applied to only one surface of the film and the film is mounted in the permeation apparatus so that the halogenated surface is in contact with the peremate zone and the non-halogenated surface is in contact with the feed zone. It is evident that the surface-halogenation of the polyolefin film may be carried out at temperatures above 50° F., e.g. 100–300° F., but below the temperature at which the film melts to any substantial extent. In place of effecting the surface halogenation by the use of gaseous halogens, the halogen may be used in the liquid state, preferably dissolved in water or some other solvent which is non-reactive with the polyolefin film. When using a liquid treating method, the liquid containing the halogen may be poured over the film surface, allowed to remain there for the desired length of time, and the remaining liquid then removed.

Prior to carrying out the surface halogenation of the polyolefin film, the film may be subjected to an irradiation treatment. The film, e.g. polyethylene, may be subjected to high energy electrons from a high voltage accelerating apparatus such as Van de Graaff accelerators, resonant transformer units, etc. A dosage level of between 1 to 200 megareps (10 to100 megareps is quite suitable) may be used in the irradiation treatment. Other types of irradiation such as with X-rays or gamma rays may be used although not necessarily with the equivalent effect. The irradiation causes cross-linking of the polyolefin film and increases its stability at higher temperatures, thereby increasing its melting point.

FIGURE 1 shows in diagrammatic form a cutaway view of a permeation apparatus and its use in concentrating or separating benzene from a mixture of benzene and methanol.

FIGURE 2 is a cross-sectional view taken along lines 2—2' of the permeation apparatus of FIGURE 1 and shows one permeation unit in detail.

FIGURE 3 is a cross-sectional view taken along lines 3—3' of the permeation cell shown in FIGURE 2.

Referring to FIGURE 1, an approximately constant boiling mixture of benzene and methanol is the feed mixture of organic chemicals which is to be separated. This mixture, which consists of about 63 weight percent benzene and 37 weight percent methanol, is passed from source 11 by way of line 12 into the interior of permeation vessel 13. In this embodiment the feed mixture is introduced under a pressure of about 75 p.s.i.g. and at a temperature of about 200° F. The interior portion of the permeation vessel 13 into which this mixture is introduced is called the feed zone 14 of the permeation apparatus. Within the permeation vessel are positioned a number of permeation cells 16. These permeation cells have a hollow interior. The cells are completely sealed off from the feed zone 14 and none of the liquid in feed zone 14 can pass therefrom into the hollow interior of the permeation cells 16 except by permeating through the plastic permeation membrane 17 which forms two faces of each permeation cell. The permeation membranes 17 are films of polypropylene which have been subjected to a surface halogenation on one side thereof. The films are so arranged in permeation cells 16 that the surface halogenated side of the film forms a boundary of the permeate zone 19 while the opposite side of the film which has not been surface-halogenated forms a boundary of the feed zone 14. The permeation cells are alternately suspended from the bottom and the top of permeation vessel 13 so as to provide a tortuous path for the mixture of benzene and methanol as it progresses from the inlet 12 to a point which is remote from the inlet and from which the non-permeated portion is withdrawn. Since the benzene permeates preferentially through the permeation membranes 17, it is obvious that the concentration of benzene in the mixture in the feed zone will diminish as the mixture passes along the tortuous path and is withdrawn as the non-permeate portion. The purpose of the tortuous path is to minimize backmixing, for backmixing tends to reduce the degree of separation that is attainable.

The mixture in feed zone 14, under the conditions described in this embodiment, is maintained in the liquid state. A lower pressure is maintained within the interior (permeate zones 19) of permeation cells 16. In this embodiment, atmospheric pressure is maintained within permeate zones 19. The pressure in permeate zones 19 is such that vaporization of the permeating mixture occurs as soon as it passes through the membrane. This permeating mixture of benzene and methanol has a higher concentration of benzene than the concentration of benzene in the feed mixture introduced from source 11. The permeated portions are rapidly withdrawn from permeate zones 19 of each of the permeation cells 16 and are passed by way of lines 21 into headers 22. These headers 22 are connected by line 23 and the permeated portion is withdrawn therefrom, condensed by means not shown herein, and passed to storage. The permeate is rich in benzene, e.g. contains about 91 weight percent benzene and only 9 weight percent methanol. By permeating this permeated portion through one or more additional permeation stages, permeate fractions can be recovered therefrom which are substantially pure benzene. The non-permeated portion is withdrawn from permeation vessel 13 by way of line 24. It is reduced in its benzene concentration and has a higher concentration of methanol than is contained in the feed mixture introduced from source 11. It may also be processed in subsequent permeation stages to recover additional amounts of benzene therefrom and/or to recover a non-permeated portion highly rich in methanol.

Referring now to FIGURE 2, permeation vessel 13 is depicted herein as being of square or rectangular cross section. It may be of circular or other shape if desired, since the shape has no bearing upon the operation or effectiveness of the process. The thickness of permeation vessel 13 is depicted herein by 25. Retaining ring 26 holds permeation membrane 17 in place within the permeation cell 16.

FIGURE 3 shows an enlarged cross section of permeation cell 16 which is taken along lines 3—3' of FIGURE 2. Spacer ring 27 separates the two permeation membranes 17 which are positioned on opposite sides of spacer ring 20. Retaining rings 26 are of the same shape as spacer ring 27 and compress permeation membranes 17 against retaining ring 26 thereby forming a leak-proof permeation cell through which the organic chemicals cannot pass except by permeating through membranes 17. A passage way 28 through the bottom of spacer ring 27 permits permeate vapors within permeate zone 19 to pass down through the passage way into connecting line 21 by which the vapors pass into manifolding line 22. When a large pressure differential is maintained between the feed zone and the permeate zone, a membrane supporting means may be positioned within the permeate zone to provide support for permeation membranes 17. This supporting means may take the form of a porous solid, close-mesh screen or the like.

In the embodiment described herein the mixture of organic chemicals is maintained in the liquid state in the feed zone and the permeated portion is removed in the vapor state from the permeate zone. This is a preferred method of operation. If desired, the mixtures of organic chemicals in both of these zones may be maintained in the vapor state, or they may be maintained in both zones in the liquid state. It is to be remembered that in any mode of operation the permeated portion should be rapidly removed from the permeate zone, for if the permeated portion is allowed to remain in contact with the permeation membrane for a long period of time the mixtures on the opposite sides of the membrane will reach equilibrium and permeation will no longer occur. The permeation temperature is preferably maintained as high as possible since the rate of permeation increases as the permeation temperature is increased. Temperatures of from 50 to 400° F. and even higher may be used, depending to some extent upon the mixture being separated. Obviously the temperature of permeation should not be so high as to cause the membrane to be ruptured easily. Many other mixtures of organic chemicals, in addition to the mixture employed in the embodiment described above, can be separated by means of this invention. For example, feed mixtures of isooctane-ethanol, benzene-cyclohexanol, heptane-butanone-2, hexanethiol-carbon disulfide, various mixtures of hydrocarbons, etc., can be charged as the feed mixture. Either wide or close boiling mixtures may be charged, and even azeotropic mixtures or other close boiling mixtures may be used as charge stocks. Mixtures of hydrocarbon such as a mixture of aromatic and non-aromatic hydrocarbons may be charged and a permeate enriched in aromatics will be produced. Mixtures of naphthenes and branched chain paraffins can be permeated to recover a permeated portion which is enriched in naphthenes. Straight chain and branched chain hydrocarbons can be permeated to recover a permeate which has a higher concentration of straight chain hydrocarbons than was contained in the feed mixture. A permeate enriched in olefins can be obtained from a charge mixture of olefins and paraffins. In general, wide varieties of oil-soluble organic chemicals can be separated from each other and/or from water-soluble organic chemicals.

A number of experiments were carried out which demonstrate the present invention. In these experiments the feed mixture, which is shown in Table 1 below for each of the individual runs, was introduced into the feed zone of a permeation apparatus. The mixture was maintained in the liquid state in the feed zone and under refluxing conditions. The permeation temperature was about 214° F. in each of the runs except for Run 4 wherein the permeation temperature was 176° F. The permeate zone was maintained at a pressure such that the permeated mixture as it passed through the membrane was immediately vaporized. The permeate vapors were rapidly and continuously withdrawn in the batch permeation runs which were carried out. The composition of the permeate was then determined. In each of the runs the permeation membrane had a thickness of 1.5 mil. An irradiated polyethylene film was used in each run, except that in Runs 2 through 4 the irradiataed polyethylene film (Irrathene–101) was surface-halogenated prior to use in the permeation experiment. The irradiated polyethylene film was conventional polyethylene film which had been subjected to a high energy electron dosage of about 15/megareps. In Run 1 this Irrathene–101 was not given a halogen surfacing. In Run 2 the Irrathene–101 was given a halogenated surface by quickly passing a Meeker burner over the film and then treating the film in a chlorine gas atmosphere at 104° F. for 6 hours. Surface-halogenation of the Irrathene–101 was carried out on the membrane used in Run 4 in the same manner, except that the flash-heated film was subjected to the chlorine atmosphere at 128° F. for 4.5 hours. Surface-halogenation of the Irrathene–101 in preparing the permeation membrane used in Run 3 was effected by contacting one side of the film with Dry Ice to chill it while the other side was heated with heat lamps in a chlorine atmosphere to a temperature of 122° F. for 16 hours. The results obtained in the permeation experiments are shown in Tabel 1 which follows:

*Table 1*

| Run No. | Treatment of Film | Composition of Charge | Composition of Permeate |
| --- | --- | --- | --- |
| 1 | None | 50% M—50% I | 56% M—44% I. |
| 2 | $Cl_2$ at 104° F. for 6 hrs. | 50% M—50% I | 63% M—37% I. |
| 3 | $Cl_2$ at 122° F. for 16 hrs. | 50% M—50% I | 63% M—37% I. |
| 4 | $Cl_2$ at 128° F. for 4.5 hrs. | 50% B—50% C | 63% B—37% C. |

M=Methylcyclohexane; I=Isooctane; B=Benzene; C=Cyclohexane.

It is evident from the above table that surface-halogenation of the polyolefin film renders it more selective in the permeation process. This can be noted by comparing the composition of the permeate for Run 1 with the composition of the permeates obtained in the other runs. This increase in selectivity which the surface-halogenated polyolefin permeation membrane displays, makes such a membrane desirable since it increases the efficiency of separation which is obtained by permeation. It minimizes the number of permeation stages which may be necessary to achieve a given degree of separation, thereby reducing equipment costs and operating costs.

While the invention has been described in relation to a specific embodiment and illustrated by certain examples, it is to be understood that it is not limited to these, but includes within its scope the separation of other mixtures and the use of other films such as would be apparent herefrom to those skilled in the art.

What is claimed is:

1. In the process of separating a mixture of organic chemicals wherein a feed mixture of organic chemicals is introduced into the feed zone of a permeation apparatus, said permeation apparatus being comprised of a feed zone which is sealed from a permeate zone by a thin plastic permeation membrane through which membrane one of the components of the feed mixture permeates at a rate more rapid than other components of the feed mixture, a portion of the mixture in the feed zone is permeated through the plastic membrane into the permeate zone and is rapidly withdrawn therefrom, a non-permeated portion is withdrawn from the feed zone, the permeated portion containing a higher concentration of the more rapidly permeating component of the feed mixture than the concentration of said same component in the feed mixture, the improvement which comprises using as the permeation membrane a polyolefin film having at least one surface which has been halogenated after the film has been formed.

2. The process of claim 1 wherein the halogenated surface of the polyolefin film is in contact with the permeate zone.

3. The process of claim 1 wherein the surface-halogenated polyolefin film is surface-halogenated cross-linked polyethylene.

4. A process for separating a mixture of organic chemicals which comprises introducing a feed mixture of organic chemicals into the feed zone of a permeation apparatus, said permeation apparatus being comprised of a feed zone which is sealed from a permeate zone by a polyethylene film through which one of the components of the feed mixture permeates at a rate more rapid than other components of the feed mixture, said polyethylene film having at least one side which has been surface halogenated after the film has been formed permeating a portion of the mixture in the feed zone through the film into the permeate zone, rapidly withdrawing the permeated portion from the permeate zone, said permeated portion having a higher concentration of one of the components of the feed mixture than the concentration of the same component in the feed mixture, and withdrawing a non-permeated portion from the feed zone.

5. The process of claim 4 wherein only one surface of the polyethylene film has said halogenated surface and said film is disposed in the permeation apparatus in a manner such that the halogenated surface thereof forms one boundary of the permeate zone and the non-halogenated surface forms one boundary of the feed zone.

6. The process of claim 4 wherein the surface-halogenated polyethylene film is cross-linked.

7. The process of claim 4 wherein a mixture of aromatic and non-aromatic hydrocarbons is introduced into the feed zone and the permeated portion contains a higher concentration of aromatic hydrocarbons than is contained in the feed mixture introduced into the feed zone.

8. The process of claim 4 wherein the feed mixture consists predominantly of naphthenes and branched chain paraffins and the permeated portion contains a higher concentration of naphthenes than is contained in the feed mixture.

9. A process for separating a mixture of organic chemicals which comprises introducing a feed mixture of organic chemicals into the feed zone of a permeation apparatus, said permeation apparatus being comprised of a feed zone which is sealed from a permeate zone by a cross-linked poyethylene film having at least one surface which has been halogenated after the film has been formed, said halogenated surface being in contact with the permeate zone and through which film one of the components of the feed mixture permeates at a rate more rapid than other components of the feed mixture, maintaining the mixture of organic chemicals in the feed zone in the liquid state, permeating a portion of the mixture in the feed zone through the film into the permeate zone, maintaining conditions in the permeate zone to cause vaporization of the permeated portion, rapidly withdrawing the permeated portion from the permeate zone, said permeated portion having a higher concentration of one of the components of the feed mixture than the concentration of the same component in the feed mixture, and withdrawing a non-permeated portion from the feed zone.

References Cited in the file of this patent

UNITED STATES PATENTS

| 2,159,434 | Frey | May 23, 1939 |
| 2,386,826 | Wallach et al. | Oct. 16, 1945 |
| 2,475,990 | Robertson | July 12, 1949 |
| 2,502,841 | Henderson | Apr. 4, 1950 |
| 2,811,468 | Joffre | Oct. 29, 1957 |

(Other references on following page)

OTHER REFERENCES

Simril et al.: I, "Modern Plastics," vol. 27, No. 10, June 1950, pages 97, 98, -00, 102, 150–152, 154, 156 and 158 relied upon. (Copy in Scientific Library.)

Simril et al.: II, "Modern Plastics," vol. 27, No. 11, July 1950, pages 95, 96, 98, 100 and 102 relied upon. (Copy in Scientific Library.)

Chemical & Engineering News, vol. 35, #1, Jan. 7, 1957, page 64. (Copy in Division 56 and Scientific Library.)